United States Patent
Schlangen et al.

(10) Patent No.: US 6,731,261 B2
(45) Date of Patent: May 4, 2004

(54) DISPLAY DEVICE

(75) Inventors: Lucas Josef Maria Schlangen, Eindhoven (NL); Hugo John Cornelissen, Eindhoven (NL); Fransiscus Anna Maria Antoine Paulissen, Heerlen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 210 days.

(21) Appl. No.: 09/835,635

(22) Filed: Apr. 16, 2001

(65) Prior Publication Data

US 2002/0039088 A1 Apr. 4, 2002

(30) Foreign Application Priority Data

Apr. 25, 2000 (EP) .............................................. 00201475

(51) Int. Cl.$^7$ ................................................ G09G 3/36
(52) U.S. Cl. ........................... 345/95; 345/89; 345/690; 345/210
(58) Field of Search ................... 345/87–103, 208–210, 345/204, 690–693

(56) References Cited

U.S. PATENT DOCUMENTS

| | | | | | |
|---|---|---|---|---|---|
| 5,010,327 A | * | 4/1991 | Wakita et al. | ............... | 340/784 |
| 5,252,954 A | * | 10/1993 | Nagata et al. | ................. | 345/95 |
| 5,437,811 A | * | 8/1995 | Doane et al. | .................. | 359/51 |
| 5,684,503 A | * | 11/1997 | Nomura et al. | ................ | 345/97 |
| 6,507,331 B1 | * | 1/2003 | Schlangen et al. | ........... | 345/100 |

FOREIGN PATENT DOCUMENTS

WO        WO9850804        11/1998

OTHER PUBLICATIONS

Patent Abstract of Japan, Publication No. 2000002869, Publication Date Jan. 7, 2000 "Liquid Crystal Display Device and Method for Driving Liquid Crystal Display Element".

* cited by examiner

Primary Examiner—Lun-Yi Lao

(57) ABSTRACT

An addressing method for obtaining grey scales in bistable chiral-nematic LCDs by using, inter alia, phase modulation between the addressing pulse and the data pulses.

6 Claims, 7 Drawing Sheets

DISPLAY DEVICE

TECHNOLOGY

Figure 1:
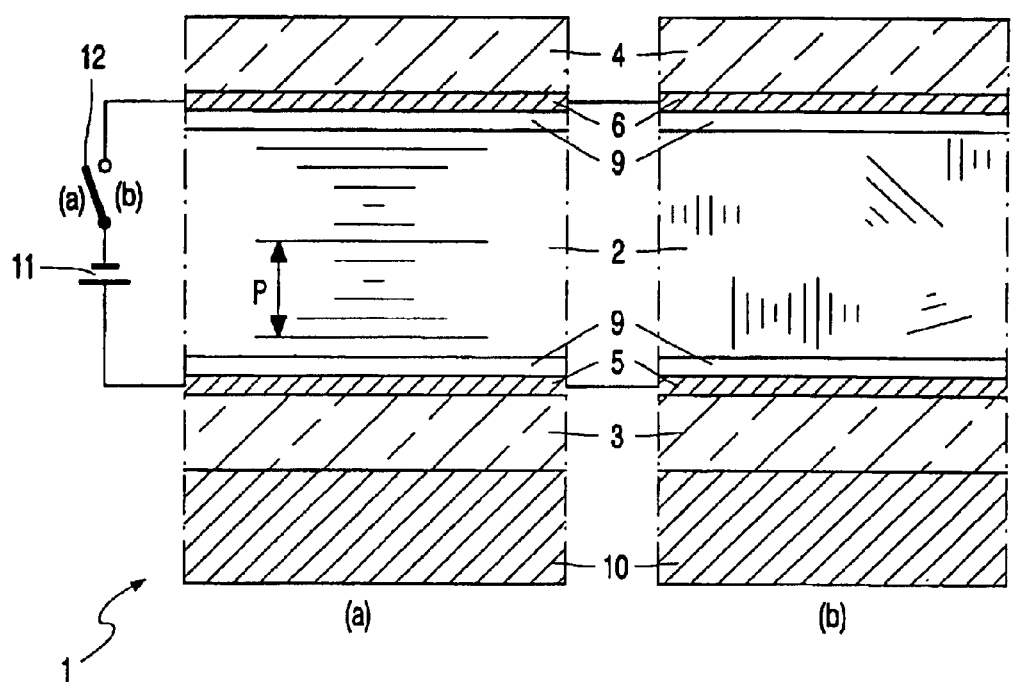

The invention relates to a display device comprising a first substrate provided with row electrodes and a second substrate provided with column electrodes, in which overlapping parts of row and column electrodes with an interpositioned layer of electro-optical material define pixels, said electro-optical layer being capable of assuming a plurality of states, at least two states of which are stable in the absence of an electric field, further comprising drive means for driving the row electrodes with selection signals and for driving the column electrodes with data signals in conformity with an image to be displayed.

Particularly, the electro-optical layer comprises a chiral-nematic liquid crystal material which can assume a plurality of states, at least one focal-conic state and a planar state of which are stable in the absence of an electric field.

More generally, the invention relates to a display device in which an electro-optical layer is switchable between a plurality of (long lasting) stable states. A display device based on two (or more) stable states may be used in various applications, for example, if information which is written once is to be maintained for a longer period of time (electronic newspapers, telephony, smart cards, electronic price tags, personal digital assistants, billboards, etc.).

BACKGROUND AND SUMMARY

A display device of the type mentioned above is described in WO 98/50804.

A display element (pixel) in such a display device, based on a chiral-nematic liquid crystal material, has several stable states, namely a transmissive state, which corresponds to the focal-conic state of a layer of liquid crystal material, and a reflective state, which corresponds to the planar state of the layer of liquid crystal material. The color (wavelength) of the reflected light is dependent on the pitch of the liquid crystal material, i.e. the distance across which the director (the average orientation of the molecules in a layer) makes a twist of 360 degrees. In the absence of an electric field, both states are stable for a long period of time. In the transmissive state, light of said color is transmitted to a greater or lesser degree, dependent on the texture (ratio between parts of a pixel in the planar and the focal-conic state, respectively). Moreover, such a display device may also be in a homeotropic state; at a high voltage, all molecules (directors) are directed towards the field. Incident light then passes the liquid crystal material unhindered. When used without polarizers, the color in the homeotropic state is determined by the color of the background, for example, an absorbing layer in a reflective display device. The display device is usually only brought to this state in order to reach one of the two stable states. Dependent on the frequency used and on the voltage of the switching pulses, a pixel changes to either the focal-conic or the planar state.

The selection time (addressing time) for writing the different states is usually rather long. Without special measures, it is 20 to 30 msec, which is too long for use in, for example, an electronic newspaper.

Said patent specification describes how the addressing time which is necessary to reach the different states can be reduced by means of a special drive mode and by means of a preparation phase and an evolution phase.

A problem in these types of display devices is the realization of intermediary transmission (reflection) levels or grey values. These are usually not stable.

It is an object of the invention to obviate this drawback completely or partly. More particularly, it is an object of the invention to provide a display device of the type described, in which stable grey values are realized. To achieve this, a display device according to the invention is characterized in that, in the operating state, the drive means provide a row electrode during a selection period with at least one pulsatory selection signal comprising a first sub-selection signal having a first amplitude and a second, opposite, sub-selection signal having substantially the same amplitude and duration, and, when the row electrode is being supplied with the first sub-selection signal, the drive means supply the column electrodes with a sub-column signal having a second amplitude and, when the row electrode is being supplied with the second sub-selection signal, the drive means supply the column electrodes with an opposite sub-column signal having substantially the same second amplitude and duration, the duration of the sub-column signals defining the grey value.

The word "opposite" is herein understood to mean that the amplitudes of the (sub-)signals are substantially identical but opposite to a certain reference level, for example, ground.

A preferred embodiment is characterized in that, in the operating state, the drive means provide a row electrode during a selection period with at least one pulsatory selection signal having a first amplitude and a first pulse width, and supply the column electrodes with data signals having substantially the same first pulse width and a second amplitude, the phase difference between the selection signal and the data signal defining a grey value at the location of a pixel. It is true that WO 98/50804 states the possibility of realizing grey values, but for this purpose use is made of time modulation or amplitude modulation. However, it appears that the defining RMS voltage varies during non-selection, dependent on voltages supplied to other elements (here, notably the voltage during the evolution phase is concerned). This variation of the RMS voltage during non-selection affects said texture (ratio between parts of a pixel in the planar and the focal-conic state, respectively), so that the grey values are also dependent on data signals supplied during selection of pixels in other rows. By making use of phase modulation according to the invention, this influence is prevented.

These and other aspects of the invention are apparent from and will be elucidated with reference to the embodiments described hereinafter.

BRIEF DESCRIPTION OF THE DRAWING FIGURE

Figure 2:
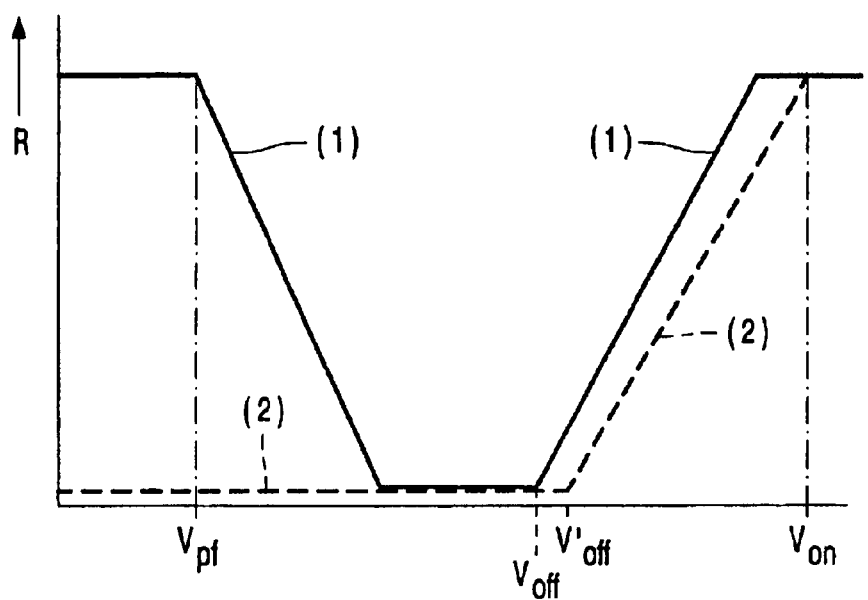
Figure 3:
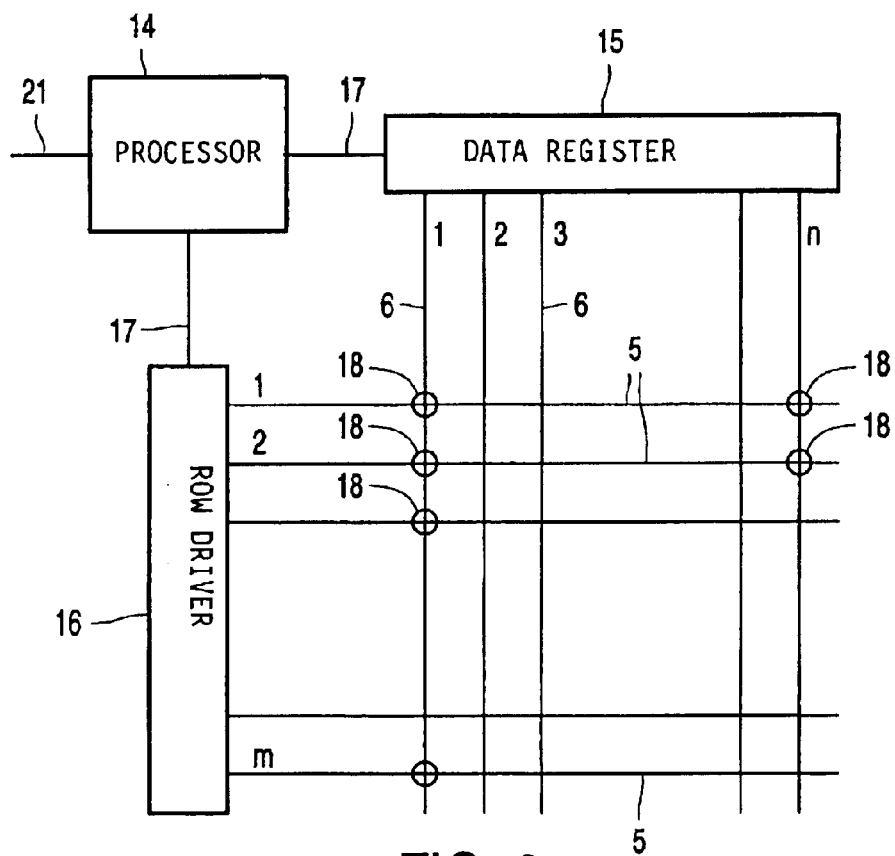

In the drawings:

FIG. 1 is a diagrammatic cross-section of a light-modulating cell according to the invention, in two different states, FIG. 2 shows diagrammatically the reflection-voltage characteristic for the display device of FIG. 1, FIG. 3 shows a practical embodiment of a display device with a matrix of pixels, while FIGS. 4 to 8 show the variation of the row and column signals at various drive modes for a simplified matrix.

The drawings are not drawn to scale and are shown diagrammatically.

DETAILED DESCRIPTION

FIG. 1 is a diagrammatic cross-section of a part of a light-modulating cell 1 with a chiral-nematic liquid crystal material 2 which is present between two substrates 3, 4 of, for example, glass, provided with electrodes 5, 6. If necessary, the device comprises orientation layers 9 which orient the liquid crystal material on the inner walls of the substrates. In this case, the liquid crystal material has a positive optical anisotropy and a positive dielectric anisotropy. In the example of FIG. 1, the light-modulating cell has an absorbing layer 10.

The chiral-nematic liquid crystal material 2 is a mixture of a nematic liquid crystal material having a positive dielectric anisotropy and chiral material which is present in such a quantity that a chiral-nematic structure results with a given pitch P; this pitch P is the distance across which the director of the liquid crystal material undergoes a twist of 360 degrees. The liquid crystal molecules are oriented more or less perpendicularly (or in some cases parallel) to a wall of the substrate. A first stable state (the planar state) now has a helix structure with pitch P (FIG. 1a). The thickness d of the light-modulating cell is several times the pitch P (for example, 6 times, but at least 2 times).

The planar state has the property that it reflects light having a wavelength in a band around $\lambda$=n.P (n: average refractive index). In the device of FIG. 1, such a liquid is chosen that the planar structure has such a pitch that it reflects, for example, blue light, while a black absorbing background 10 is chosen. Blue characters against a black background (or the other way around) are then generated with the display device shown.

Another stable state which can be assumed by such a chiral-nematic liquid crystal material is the focal-conic state (FIG. 1b), which is produced after the electrodes 5, 6 are energized with one or more electric voltage pulses of a given value (shown by means of a voltage source 11 and a switch 12 in FIG. 1). The helix structure is broken up, as it were, into parts which are arbitrarily oriented and in which incident light is no longer (partly) reflected but can reach the absorbing background.

At a high voltage across the light-modulating cell, the liquid crystal material assumes a third state referred to as the homeotropic state, i.e. all molecules are directed towards the field and the light-modulating cell is transparent to all (visible) wavelengths. Dependent on the drive voltage (period of time and amplitude of the signals) the light-modulating cell switches from this state to either the planar or the focal-conic state.

FIG. 2 shows diagrammatically the reflection-voltage characteristic for the pixel of FIG. 1. The state at zero voltage is dependent on the history. By way of illustration, the chiral-nematic state is chosen for this purpose so that the pixel reflects blue light with a high reflection value R. At a pulse with an effective value of the (threshold) voltage $V_{pf}$, the liquid changes to the focal-conic state (curve 1), in which R is substantially zero (the background is visible). When the effective voltage of the pulse is further increased, the reflection decreases from $V_{off}$ to a high value. If the liquid is in the focal-conic state at 0 volt, the increase of reflection starts at a slightly higher effective voltage $V'_{off}$ (curve 2) and reaches the high reflection at $V_{on}$. In the transition area $V_{off}$-$V_{on}$, intermediate reflection levels are possible which are, however, not defined unambiguously; for alphanumerical applications, this is no drawback. By erasing the display device (or a part thereof), as it were, for example (with one or more pulses) via the homeotropic state, prior to each selection (writing of information), it is achieved that the curves (1), (2) coincide so that $V_{off}$ and $V_{on}$ are fixed unambiguously. Here, $V_{off}$ and $V_{on}$ are defined by the reflection-voltage characteristic (for example 1% and 99% of the maximum reflection) but may be defined differently, if required (for example, 5% and 95% of the maximum reflection). The display device (or a part thereof) may also be erased via the focal-conic state (or another state fixed unambiguously, for example a grey scale such as mid-grey).

FIG. 3 is an electric equivalent of a display device 1 to which the invention is applicable. It comprises a matrix of pixels 18 at the area of crossings of m row or selection electrodes 5 and n column or data electrodes 6. The row electrodes are consecutively selected via a row driver 16, while the column electrodes are provided with data via a data register 15. To this end, incoming data signals 21 are first processed in a processor 14, if required. Mutual synchronization takes place via drive lines 17.

Figure 4:
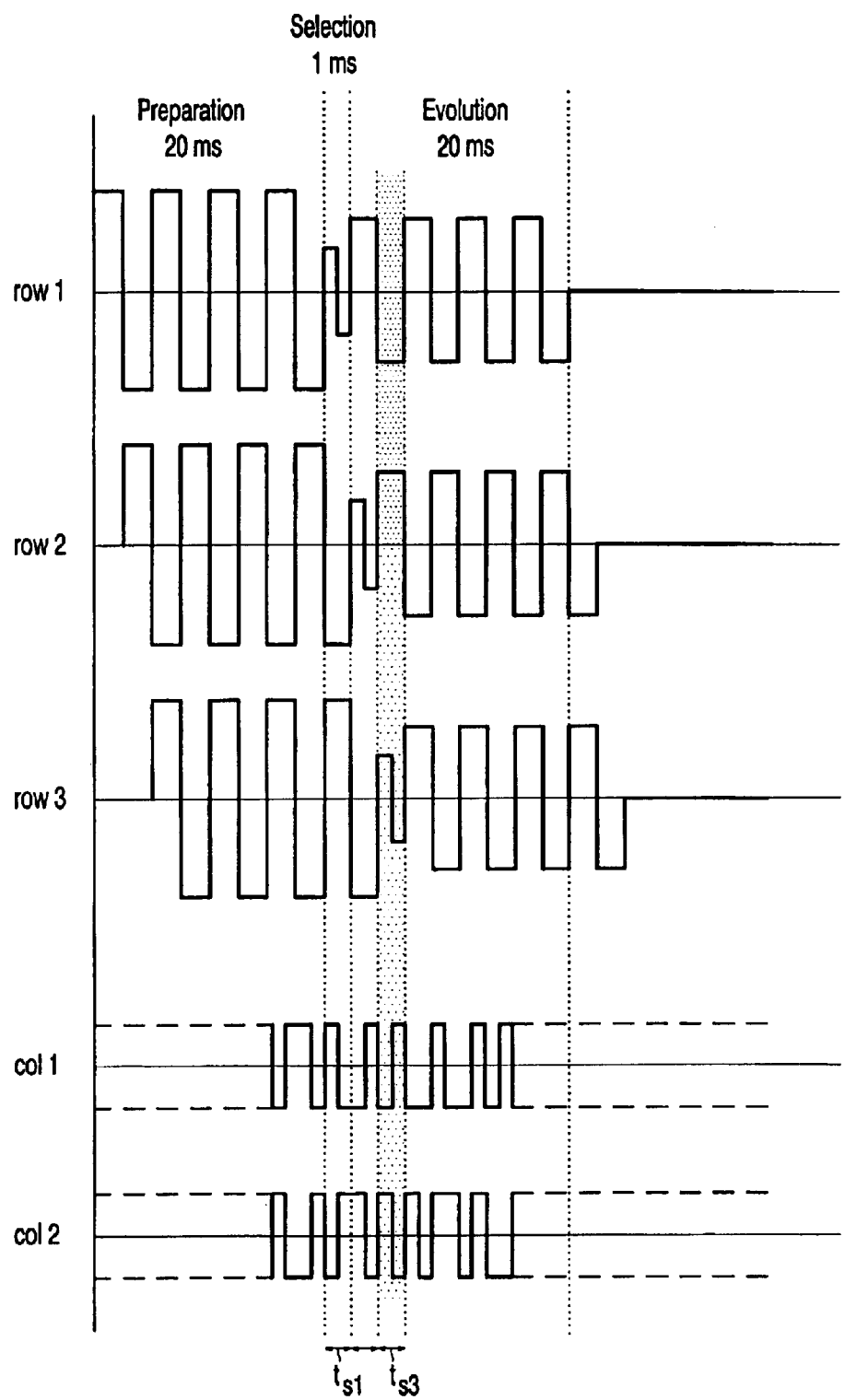

FIG. 4 shows a plurality of row or selection signals for driving the display device 1 for the rows 1 to 3 inclusive, while data are presented to the columns 1 and 2, such that during selection of row 3 (the time domain denoted by the double arrow $t_{s3}$) the pixel in row 3 is fully switched on at the location of column 1 and the pixel in row 3 is fully switched off at the location of column 2. The selection pulses have an absolute value of 9 volts and are preceded by preparation signals having an absolute value of 35 volts, and are followed by an evolution phase with pulses having an absolute value of 23 volts.

Figure 5:
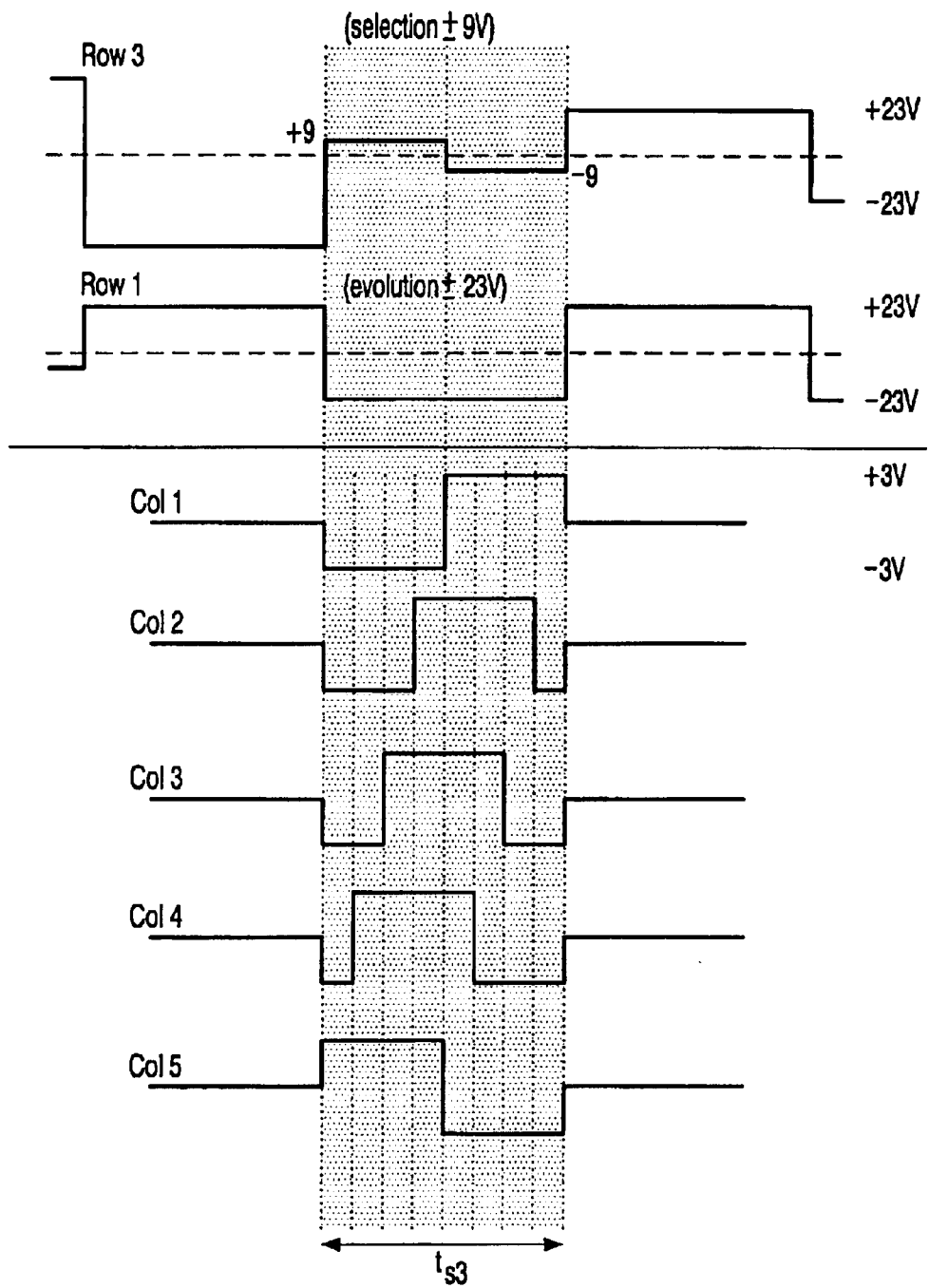

FIG. 5 shows the time domain by means of the double arrow $t_{s3}$ on an enlarged scale, while pulses having an absolute value of 3 volts and a phase which is shifted or not shifted with respect to the selection pulse are presented to the columns 1 to 5. For the voltages $V_{pixel}$ on the pixels, it holds during selection and non-selection (evolution)

TABLE 1

| Column | $V_{pixel}$ during selection | $V_{pixel}$ during non-selection |
|---|---|---|
| 1 | $V_{row\,sel} + V_{col}$ | $\sqrt{\left[\frac{1}{2}(V_{rownonsel} + V_{col})^2 + \frac{1}{2}(V_{rownonsel} - V_{col})^2\right]}$ |
| 2 | $\sqrt{\left[\frac{3}{4}(V_{rowsel} + V_{col})^2 + \frac{1}{4}(V_{rowsel} - V_{col})^2\right]}$ | $\sqrt{\left[\frac{1}{2}(V_{rownonsel} + V_{col})^2 + \frac{1}{2}(V_{rownonsel} - V_{col})^2\right]}$ |
| 3 | $\sqrt{\left[\frac{1}{2}(V_{rowsel} + V_{col})^2 + \frac{1}{2}(V_{rowsel} - V_{col})^2\right]}$ | $\sqrt{\left[\frac{1}{2}(V_{rownonsel} + V_{col})^2 + \frac{1}{2}(V_{rownonsel} - V_{col})^2\right]}$ |

TABLE 1-continued

| Column | $V_{pixel}$ during selection | $V_{pixel}$ during non-selection |
|---|---|---|
| 4 | $\sqrt{\left[\frac{1}{4}(V_{rowsel}+V_{col})^2+\frac{3}{4}(V_{rowsel}-V_{col})^2\right]}$ | $\sqrt{\left[\frac{1}{2}(V_{rownonsel}+V_{col})^2+\frac{1}{2}(V_{rownonsel}-V_{col})^2\right]}$ |
| 5 | $V_{row\ sel}-V_{col}$ | $\sqrt{\left[\frac{1}{2}(V_{rownonsel}+V_{col})^2+\frac{1}{2}(V_{rownonsel}-V_{col})^2\right]}$ |

The following RMS voltages are found with the aid of these formulas for the pixels in rows 1 and 3:

TABLE 2

| | Row 3 (selection) | Row 1 (evolution) |
|---|---|---|
| Col 1 | 12 V | 23.2 V |
| Col 2 | 10.8 V | 23.2 V |
| Col 3 | 9.5 V | 23.2 V |
| Col 4 | 7.9 V | 23.2 V |
| Col 5 | 6 V | 23.2 V |

It appears from the Table above that during selection of a row (in this example, row 3), a scale of grey levels can be adjusted in dependence upon the phase difference between the selection pulse and the data pulse, while the evolution voltage for all columns is identical when adjusting each of these levels in the non-selected rows (in this example, row 1). Variation of the RMS voltage during non-selection does not influence the texture (ratio between parts of a pixel in the planar and the focal-conic state, respectively), so that the grey values are independent of data signals presented during selection of pixels in other rows.

Figure 6:
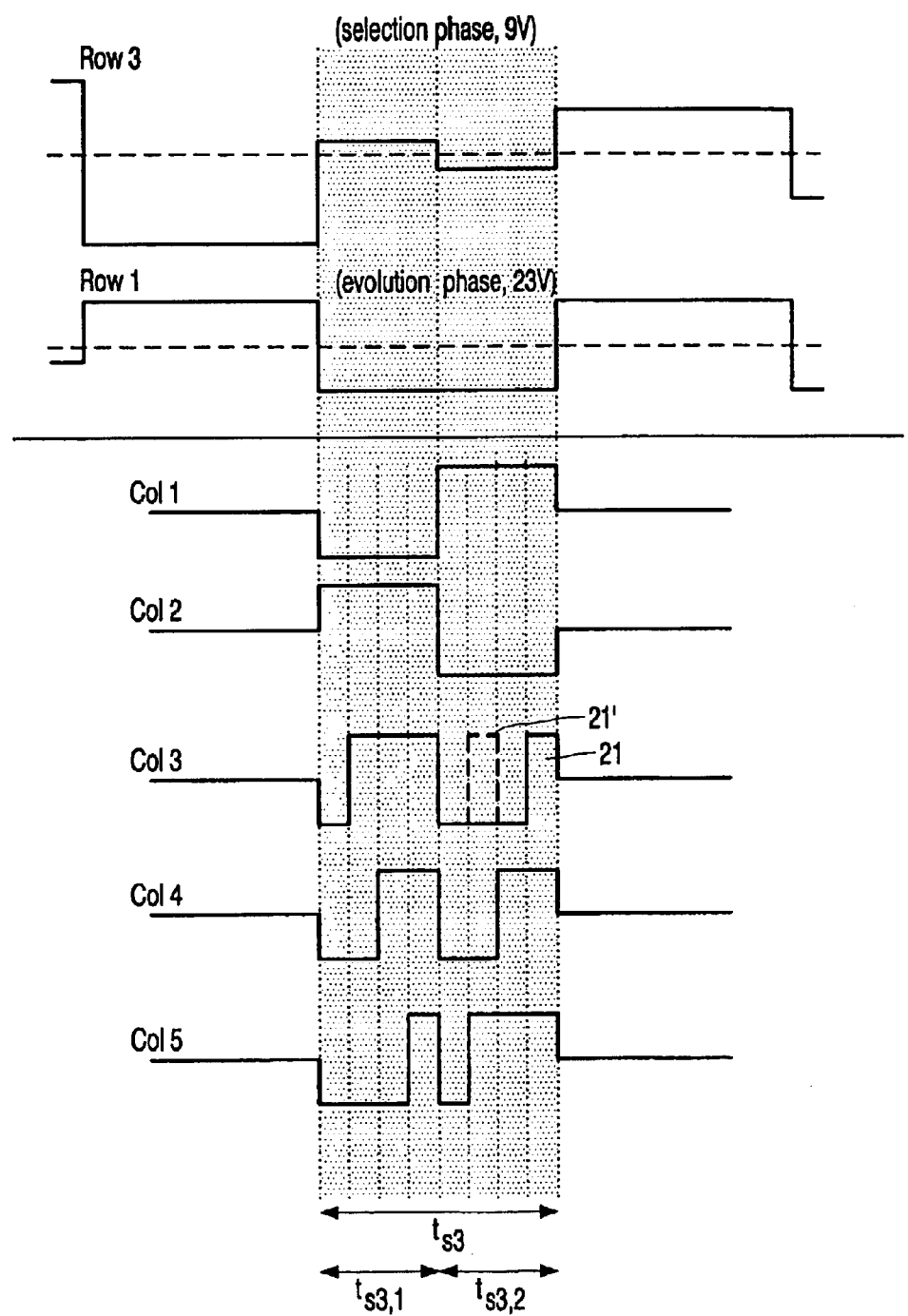

The same applies to the signals as shown in FIG. 6. The RMS voltages in the evolution phase are identical during the two sub-selection periods $t_{s3,1}$ and $t_{s3,2}$ so that it holds for the ultimate RMS voltages that:

TABLE 3

| | Row 3 (selection) | Row 1 (evolution) |
|---|---|---|
| Col 1 | 12 V | 23.2 V |
| Col 2 | 6 V | 23.2 V |
| Col 3 | 7.9 V | 23.2 V |
| Col 4 | 9.5 V | 23.2 V |
| Col 5 | 10.8 V | 23.2 V |

In this respect it is to be noted that a pulse, for example pulse 21 in FIG. 6 (Col. 3) may shift (indicated as 21') within the two sub-selection periods $t_{s3,1}$ and $t_{s3,2}$.

Figure 7:
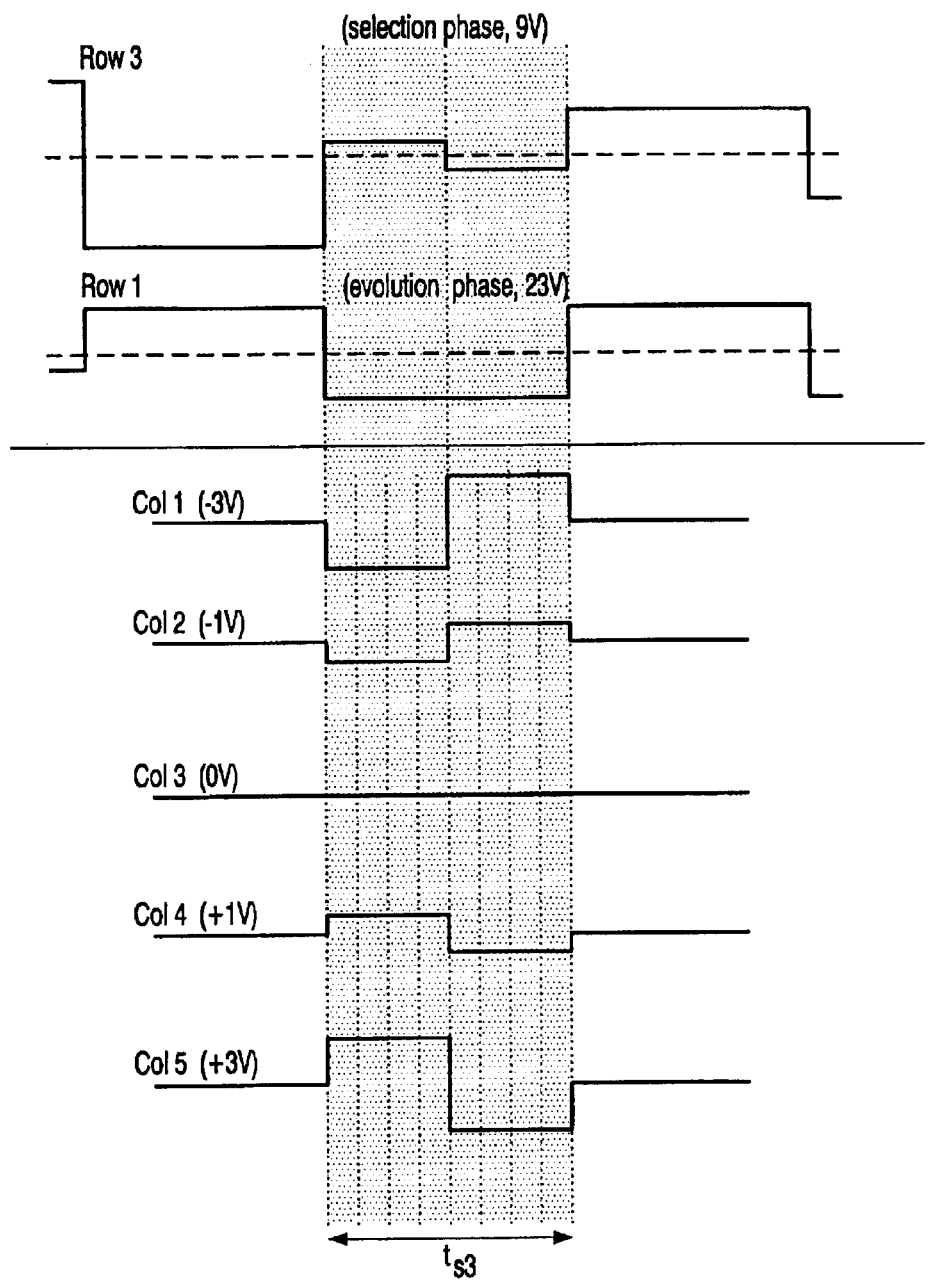

FIG. 7 shows how the same information is written by means of amplitude-modulated signals on the column electrodes. Using the formulas of Table 1, the following RMS voltages are now found for the pixels in rows 1 and 3:

TABLE 4

| | Row 3 (selection) | Row 1 (evolution) |
|---|---|---|
| Col 1 | 12 V | 23.2 V |
| Col 2 | 10 V | 23 V |
| Col 3 | 9 V | 23 V |

TABLE 4-continued

| | Row 3 (selection) | Row 1 (evolution) |
|---|---|---|
| Col 4 | 8 V | 23 V |
| Col 5 | 6 V | 23.2 V |

It appears from Table 4 that during selection of a row (in this example, row 3 again) a scale of grey levels can be adjusted in dependence on the amplitude of the data pulse, but the evolution voltage on the non-selected rows varies when adjusting each of these levels. This variation of the RMS voltage during non-selection influences, as stated, the textures so that the grey values are now also dependent on data signals presented during selection of pixels in other rows.

Figure 8:
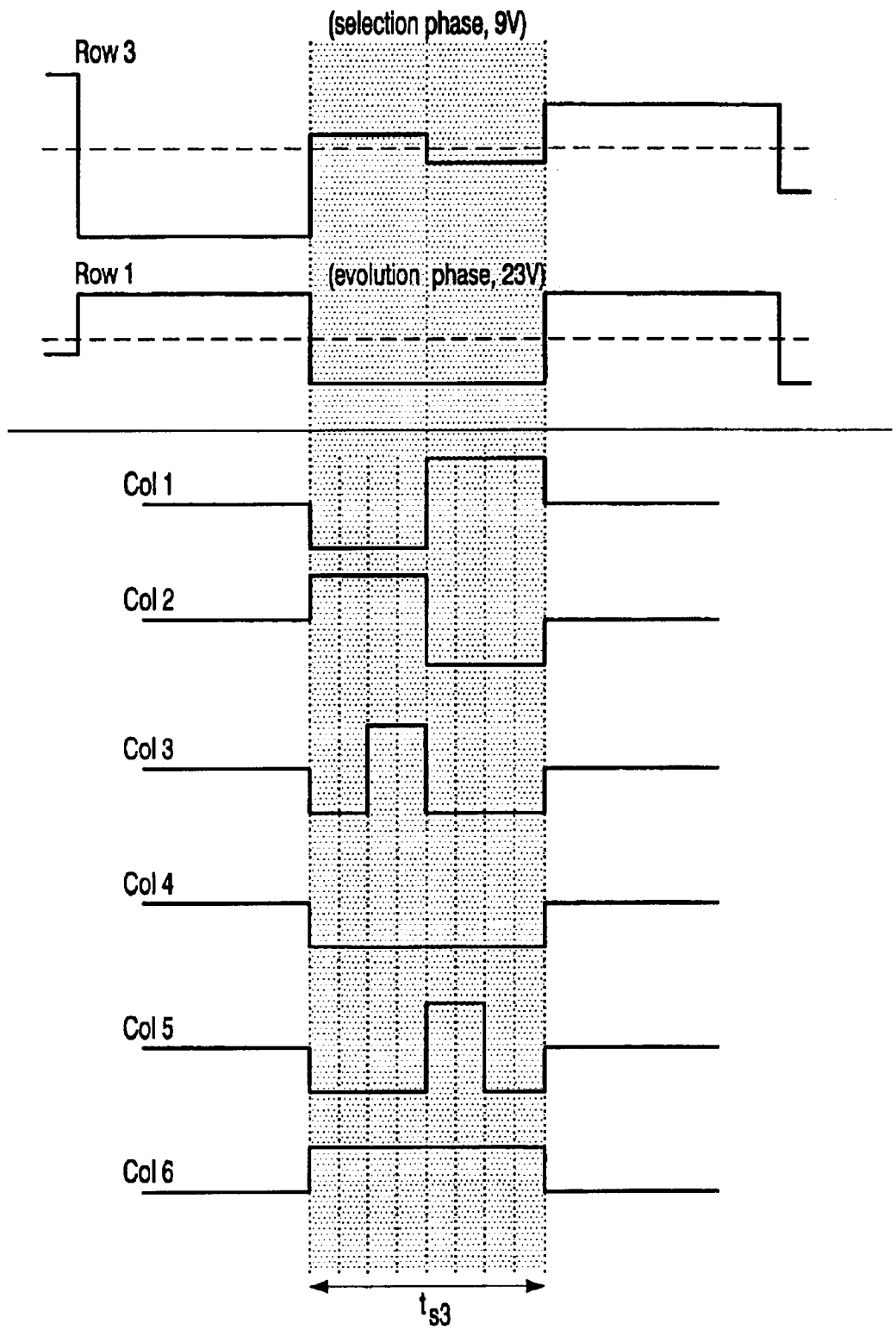

The same applies to the signals as shown in FIG. 8 in which grey levels are adjusted by means of pulse width modulation. Using the formulas of Table 1, the following RMS voltages are now found for the pixels in rows 1 and 3:

TABLE 5

| | Row 3 (selection) | Row 1 (evolution) |
|---|---|---|
| Col 1 | 12 V | 23.2 V |
| Col 2 | 6 V | 23.2 V |
| Col 3 | 7.9 V | 21.7 V |
| Col 4 | 9.5 V | 20 V |
| Col 5 | 10.8 V | 21.7 V |
| Col 6 | 9.5 V | 26 V |

The invention is of course not limited to the example shown, but several variations are possible. For example, it is not absolutely necessary to make use of the reflective properties of cholesteric-nematic liquid crystal material. At a suitable choice of thickness and material, polarization rotation occurs in the cholesteric-nematic liquid crystal material. Transmissive or reflective display devices can then be realized by means of polarizers and a suitable detection means. As stated in the opening paragraph, it is possible to reduce addressing periods, which are required to reach different states, by way of a special drive mode, by means of a preparation phase and an evolution phase in which the actual selection period is in between these phases. Also the separate use of a preparation phase or an evolution phase is possible. As has also been stated, the invention is applicable to a display device having a layer of electro-optical material which can assume a plurality of states, at least two states of which are stable in the absence of an electric field, while the electro-optical material is driven by an RMS signal during addressing and the reflection (transmission)-voltage characteristics for both states have a threshold; the further characteristics do not need to have a variation which is identical to the curve as shown in, for example, FIG. 2 for a chiral-nematic material but must coincide at at least 2 points.

The invention resides in each and every novel characteristic feature and each and every combination of characteristic features.

What is claimed is:

1. A display device comprising:
   a first substrate having a plurality of row electrodes;
   a second substrate having a plurality of column electrodes;
   a layer of electro-optical material disposed between the first and second substrates, said layer of electro-optical material being capable of assuming a plurality of states, at least two states of which are stable in the absence of an electric field;
   drive means for driving the row electrodes with selection signals and for driving the column electrodes with data signals in conformity with an image to be displayed,
   wherein, in an operating state, the drive means provide a row electrode during a selection period with at least one pulsatory selection signal comprising a first sub-selection signal having a first amplitude and a first polarity, and a second sub-selection signal having substantially a same amplitude and duration as the first sub-selection signal and having a second polarity opposite to the first polarity,
   wherein, when the row electrode is being supplied with the first sub-selection signal, the drive means provides at least one of the column electrodes with a first sub-column signal having a second amplitude, the first sub-column signal having the first polarity for a first portion of the first sub-column signal and having the second polarity for a second portion of the first sub-column signal, and
   wherein, when the row electrode is being supplied with the second sub-selection signal, the drive means supplies the at least one column electrode with a second sub-column signal having substantially the same second amplitude, the second sub-column signal having the second polarity for a first portion of the second sub-column signal and having the first polarity for a second portion of the second sub-column signal, the first portion of the second sub-column signal being of equal duration to the first portion of the first sub-column signal, and the second portion of the second sub-column signal being of equal duration to the second portion of the first sub-column signal.

2. The display device of claim 1, wherein the first portion of the first sub-column signal occurs subsequent to the second portion of the first sub-column signal.

3. The display device of claim 1, wherein the first portions of the first and second sub-column signals are longer in duration than the second portions of the first and second sub-column signals, respectively.

4. The display device of claim 1, wherein a transition between the first and the second the sub-column signals maintains a constant polarity during a transition from the first sub-selection signal to the second sub-selection signal.

5. The display device of claim 1, wherein the first portions of the first and second sub-column signals are each non-contiguous.

6. The display device of claim 1, wherein a difference in duration between the first portion of the first sub-column signals and the second portion of the first sub-column signal defines a grey scale value displayed by a corresponding pixel.

* * * * *